United States Patent [19]

Wilson

[11] Patent Number: 5,135,267

[45] Date of Patent: Aug. 4, 1992

[54] CONNECTION FITTINGS AND COMBINATION THEREOF WITH CONDUITS AND METHOD OF ASSEMBLY

[75] Inventor: Roger Wilson, Auckland, New Zealand

[73] Assignee: Van Leer Australia Pty. Ltd., New South Wales, Australia

[21] Appl. No.: 437,647

[22] Filed: Nov. 16, 1989

[30] Foreign Application Priority Data

Nov. 17, 1988 [NL] Netherlands ............................ 226982

[51] Int. Cl.⁵ .............................................. F16L 55/17
[52] U.S. Cl. ..................................... 285/174; 285/256; 285/259; 285/382.2; 285/398; 285/419; 29/517
[58] Field of Search ............... 285/155, 156, 256, 259, 285/331, 337, 419, 423, 174, 915, 371, 398, 419, 382.2, 373; 29/516, 515, 517

[56] References Cited

U.S. PATENT DOCUMENTS

| | | | |
|---|---|---|---|
| 1,755,899 | 4/1930 | Root | 285/373 X |
| 3,017,203 | 1/1962 | MacLeod | 29/516 |
| 3,442,537 | 5/1969 | Courtot et al. | 285/174 |
| 3,596,933 | 8/1971 | Luckenbill | 285/331 X |
| 3,679,239 | 7/1972 | Schmitt | 285/331 X |
| 3,843,169 | 10/1974 | Wise | 285/331 X |
| 4,109,944 | 8/1978 | Curtin | 285/373 |
| 4,293,150 | 10/1981 | Press | 285/149 |
| 4,392,678 | 7/1983 | Adamczyk | 285/256 |
| 4,648,628 | 3/1987 | Meadows et al. | 285/156 X |
| 4,726,612 | 2/1988 | Picton | 285/156 X |
| 4,903,998 | 2/1990 | Stanley | 285/156 |
| 4,915,424 | 4/1990 | Sarno et al. | 285/156 |
| 4,997,213 | 3/1991 | Traner et al. | 285/292 X |

FOREIGN PATENT DOCUMENTS

| | | |
|---|---|---|
| 8853682 | 3/1984 | Australia . |
| 4026885 | 9/1985 | Australia . |
| 5637886 | 3/1987 | Australia . |
| 2734188 | 6/1989 | Australia . |
| 0312758 | 9/1988 | Fed. Rep. of Germany . |
| 84595 | 5/1941 | New Zealand . |
| 84596 | 5/1941 | New Zealand . |
| 84597 | 5/1941 | New Zealand . |
| 84599 | 5/1941 | New Zealand . |
| 85266 | 11/1941 | New Zealand . |
| 85816 | 6/1942 | New Zealand . |
| 85848 | 6/1942 | New Zealand . |
| 85849 | 6/1942 | New Zealand . |
| 86140 | 9/1942 | New Zealand . |
| 92479 | 12/1945 | New Zealand . |
| 102829 | 1/1950 | New Zealand . |
| 103122 | 3/1950 | New Zealand . |
| 105273 | 4/1951 | New Zealand . |
| 128686 | 3/1961 | New Zealand . |
| 144737 | 4/1966 | New Zealand . |
| 156791 | 6/1969 | New Zealand . |
| 158009 | 10/1969 | New Zealand . |
| 158354 | 11/1969 | New Zealand . |

(List continued on next page.)

Primary Examiner—Randolph A. Reese
Assistant Examiner—Heather Chun
Attorney, Agent, or Firm—Christie, Parker & Hale

[57] ABSTRACT

A conduit connection fitting includes a core member having an axial bore therethrough and two or more spigot portions, and a sleeve member encasing a central part of the core member. The spigot portions extend beyond the ends of the sleeve member which may be constructed in two hinged halves, preferably of a moulded plastics material. The sleeve member is stepped adjacent each spigot portion to provide an annular rebate to receive a swagable collar. A conduit is combined with the fitting by swaging the collar to the conduit which fixes the collar and the conduit to the spigot portion.

A method of assembling such a connection fitting, the sleeve is positioned about the central part of the core member, such that the spigot portions extend beyond the ends of the sleeve. An annular slot is formed around the spigot by putting a collar around the spigot, which collar is supported by the rebate. The conduits to be connected are positioned in eah slot, and the collars are then swaged.

12 Claims, 4 Drawing Sheets

FOREIGN PATENT DOCUMENTS

| | | |
|---|---|---|
| 161193 | 8/1970 | New Zealand . |
| 161275 | 8/1970 | New Zealand . |
| 161552 | 9/1970 | New Zealand . |
| 163241 | 3/1971 | New Zealand . |
| 173736 | 3/1974 | New Zealand . |
| 176165 | 12/1974 | New Zealand . |
| 181629 | 7/1976 | New Zealand . |
| 187458 | 7/1976 | New Zealand . |
| 181584 | 10/1977 | New Zealand . |
| 186463 | 2/1978 | New Zealand . |
| 187062 | 4/1978 | New Zealand . |
| 187784 | 7/1978 | New Zealand . |
| 200135 | 3/1982 | New Zealand . |
| 200846 | 6/1982 | New Zealand . |
| 201900 | 3/1983 | New Zealand . |
| 206181 | 11/1983 | New Zealand . |
| 206421 | 11/1983 | New Zealand . |
| 212378 | 6/1985 | New Zealand . |
| 215797 | 4/1986 | New Zealand . |
| 1233366 | 5/1971 | United Kingdom ................. 285/371 |

CONNECTION FITTINGS AND COMBINATION THEREOF WITH CONDUITS AND METHOD OF ASSEMBLY

FIELD OF THE INVENTION

This invention relates to fittings for connecting conduits, and/or a method of assembling such a fitting, and is intended particularly though not necessarily solely to provide a fitting for providing joints or intersections in domestic plumbing.

SUMMARY OF THE INVENTION

It is an object of the invention to provide a fitting for connecting two or more conduits, and/or a method of assembling such a fitting, which will at least provide the public with a useful choice.

Accordingly, in one aspect, the invention consists in a conduit connection fitting, comprising a core member having an axial bore therethrough and two or more spigot portions; and a sleeve member encasing a central part of said core member; said spigot portions extending beyond the ends of said sleeve member; said sleeve member being stepped adjacent each spigot portion so as to provide an annular rebate. A collar is positioned on the rebate so as to form an annular slot. A conduit is positioned within the annular slot, and the collar is swaged so that the collar and conduit fix to the spigot portion.

In a further aspect the invention consists in a method of assembling a conduit connection fitting, comprising the steps of: providing a core member having an axial bore therethrough and two or more spigot portions and positioning a sleeve member about the central part of said core member so that said spigot portions extend beyond the ends of said sleeve member, said sleeve member being stepped adjacent each spigot portion so as to provide an annular rebate.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWING

The preferred form of the invention will now be described with reference to the accompanying drawings, in which.

DETAILED DESCRIPTION OF THE INVENTION

Figure 1:
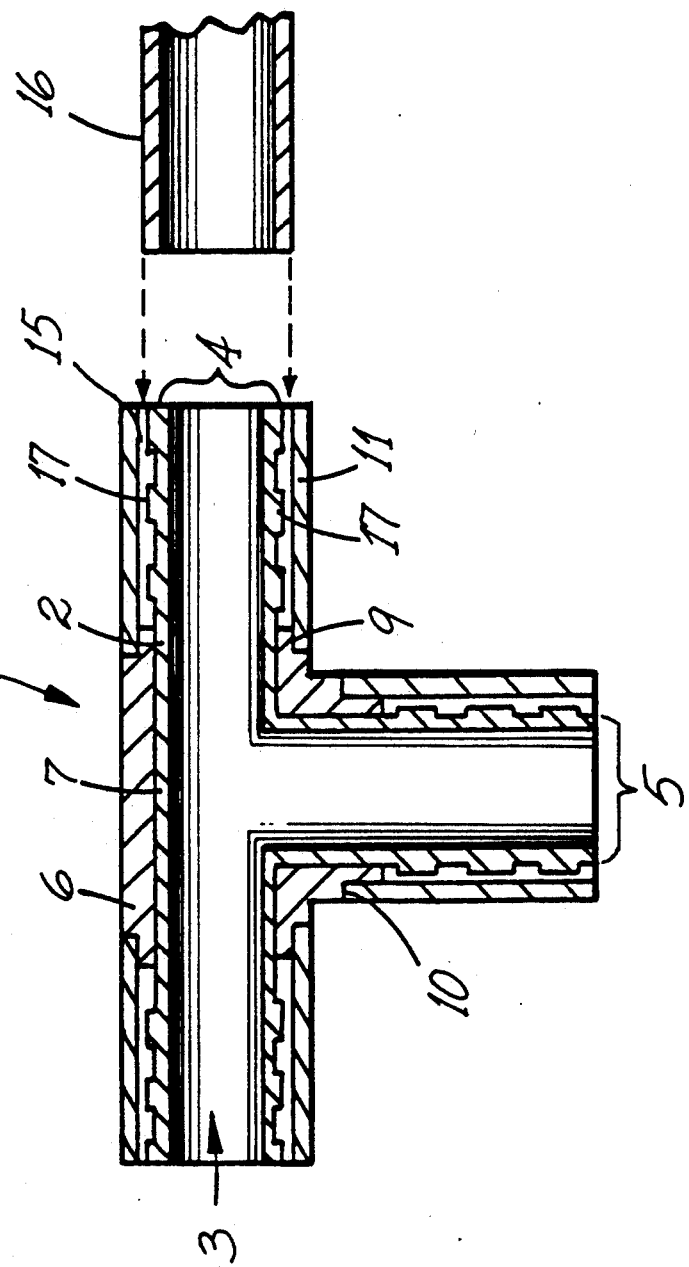
FIG. 1 shows a cross section of a three-way conduit connection fitting constructed in accordance with the invention.
Figure 2:
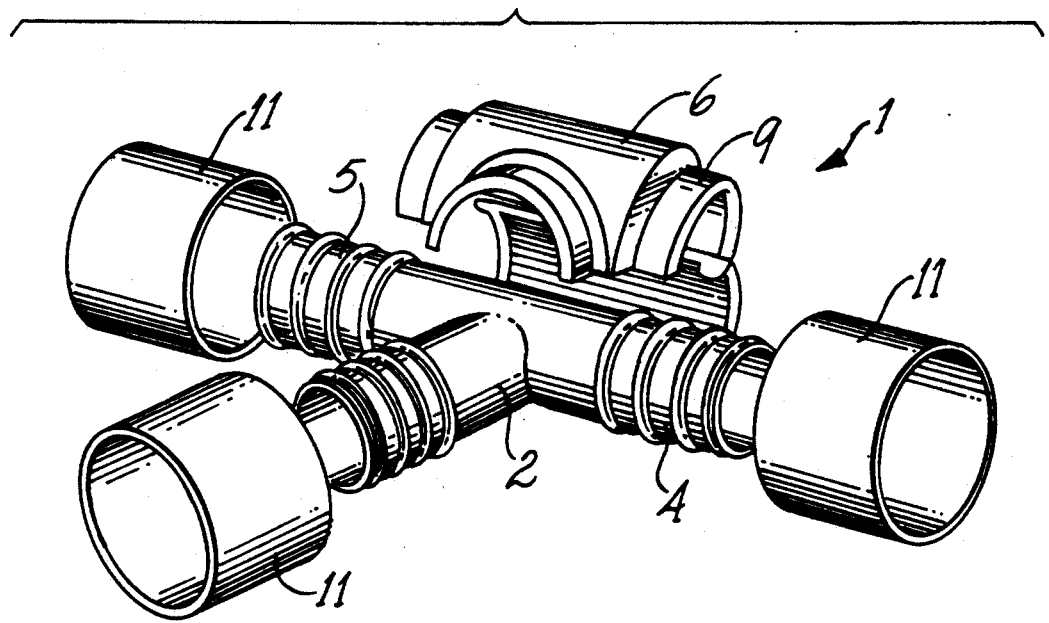
FIG. 2 shows a perspective view of the connection fitting of FIG. 1, with a hinged sleeve member in an open position.
Figure 3:
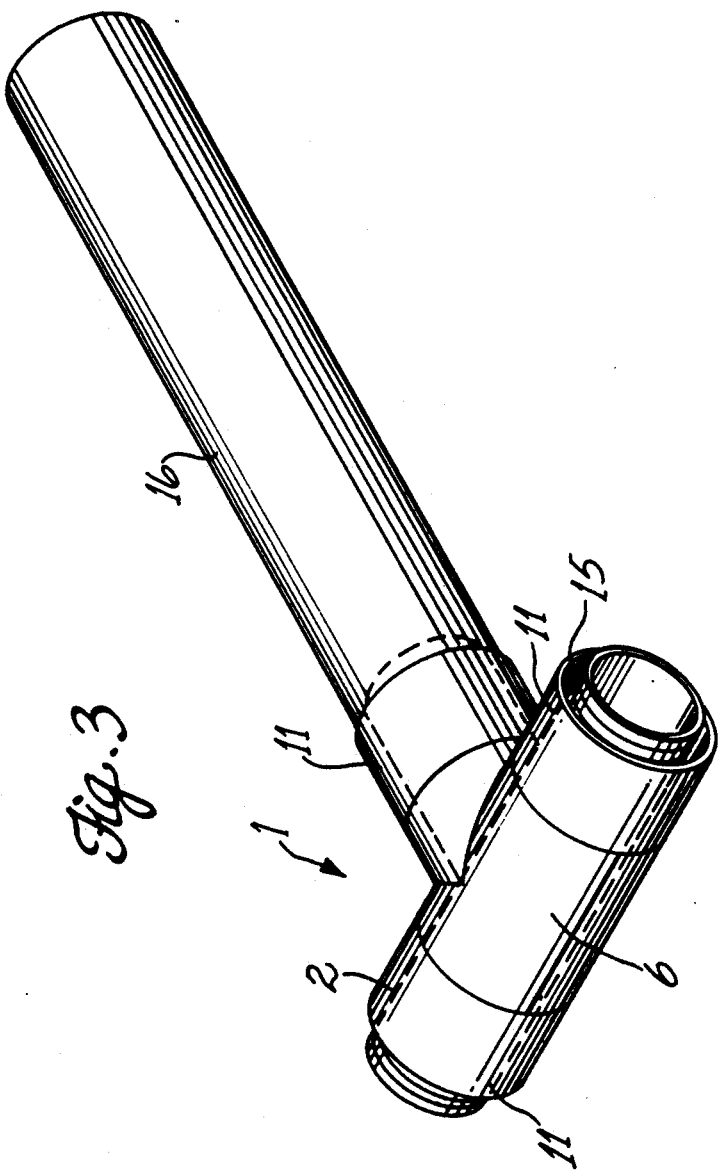
FIG. 3 shows a perspective view of the conduit connection of FIG. 1 in which a conduit is connected to a spigot with a collar swaged around the conduit and spigot.

Referring now to the FIGS. 1-3, a conduit connection fitting 1 is provided comprising a core member 2 having an axial bore 3 therethrough and two or more spigot portions such as 4 and 5, and a sleeve member 6 encasing a central part of the core member 2. The spigot portions 4, 5 extend beyond the ends of the sleeve member 6. The sleeve member 6 is stepped adjacent each spigot portion 4, 5 so as to provide an annular rebate 9, 10 or recess forming a shoulder adjacent each spigot portion.

In the assembled form as shown, the fitting further preferably includes a collar 11 positioned on each rebate such as 9 and extending around each spigot portion such as 4 so as to provide an annular slot 15 between the inner surface of the collar 11 and the outer surface of the spigot 4.

The collars 11 are preferably constructed of a material capable of being swaged onto a conduit 16 when the end of the conduit is positioned in the annular slot 15, as best shown in FIG. 3 where collar 11 around the central spigot is swaged onto conduit 16 to attach the conduit to the spigot; and. The collars may for example be constructed of copper, aluminum, or other suitable materials as will be apparent to those skilled in the art.

The sleeve portion 6 is preferably constructed of a substantially resilient material, at least in the region of the rebates 9, and may suitably be constructed of a moulded plastics material such as EVA or polyethylene. In at least the preferred form of the invention, the sleeve member 6 is moulded in two halves which may be hinged to one another, allowing the sleeve member to be opened to enable it to be fitted around the core member 2 during assembly of the fitting, as best shown in FIG. 2.

The spigot portions such as 4 and 5 of the core member 2 may also preferably include one or more circumferential ribs 17 on the outer surfaces thereof. The core member may suitably be constructed of copper or any other suitable material as will be apparent to those skilled in the art to which the invention relates.

The assembly and use of the conduit connection fitting in accordance with the invention will now be described.

The conduit connection fitting of the invention is assembled by positioning the sleeve member 6 about the central part 7 of the core member 2 having an axial bore therethrough, so that the spigot portions such as 4 and 5 extend beyond the ends of the sleeve member 6. If the sleeve member 6 is provided in two halves, preferably hinged together, then the core member 2 may be positioned in one half of the encasing sleeve member 6 and the second half of sleeve member 6 then positioned around the other side of the core member 2. The two halves may be bonded together at this point, or fixed together by the addition of further components to the fitting.

Collars such as 11 can then be push fitted onto the fitting so as to rest on the rebate 9 of the sleeve member 6 and extend around the protruding spigot portions 4, 5, thus providing an annular slot 15.

Figure 4:
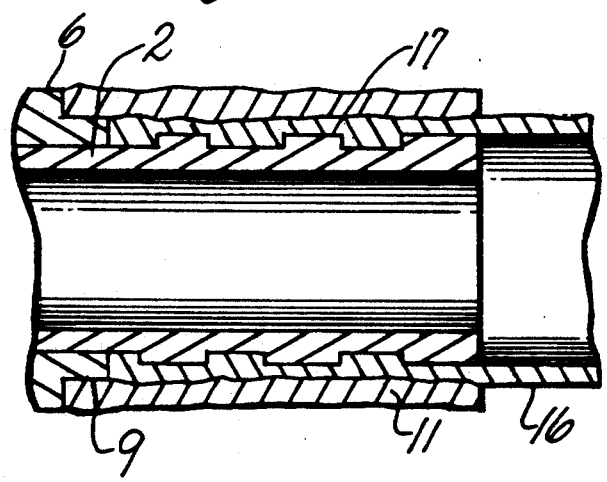
FIG. 4 is an enlarged sectional view showing one conduit swaged to a spigot portion by swaging a collar around the conduit.

In use as a connection fitting, the end of a conduit 16 is pushed into the annular slot 15, as shown by the dashed arrows in FIG. 1, and the collar 11 is swaged so as to grip the end of the conduit 16 between the inner surface of the collar 11 and the outer surface of the spigot portion 4. If ribs 17 are provided on the spigot portion 4, these can aid in securing the conduit member 16 once swaged. FIG. 4 shows the combination of conduit 16 and the fitting, with conduit 16 swaged to one of the spigot portions by swaging collar 11.

The resilient material of the rebate 9 of the sleeve member 6 is able to be compressed or squeezed during the swaging process, so that the jaws of the swage machine are able to sufficiently close around the collar even relatively close to the end of the sleeve member 6.

It will be apparent that with a plurality of conduits 16 fitted in this way to the various spigot portions such as 4 and 5 of the fitting, a joint is provided in a system of conduits. This fitting and method are particularly suitable for the connection of domestic plumbing pipes such as polybutylene pipes.

It will be apparent that a conduit connection fitting and/or a method of assembling the same is provided which has the advantage of providing a substantially non-leaking joint which is able to be readily assembled and, once assembled, easily used in connecting pipes or conduits by a simple technique of push fitting and swaging. The rebated sleeve portion is particularly advantageous in providing a close and leak proof seal while not interfering with the swaging process, while the rigid, for example copper, core member provides a good base for the swaging and a rigid connection portion.

What is claimed is:

1. A conduit connection fitting in combination with a conduit, comprising:
   a conduit; and
   a fitting, comprising:
   a rigid core member having an axial bore therethrough and at least two spigot portions; and
   a resilient sleeve member encasing a central part of the core member, wherein the sleeve member is adapted for opening and closing so that it is positionable about the central part of the core; the spigot portions extending beyond ends of the sleeve member; the sleeve member being stepped adjacent each spigot portion so as to provide an annular rebate; and a collar supported on each rebate, each collar extending around each spigot portion for forming an annular slot between an inner surface of the collar and an outer surface of the spigot portion for slidably receiving a conduit, wherein the collar comprises a material capable of being swaged, the conduit is positioned in the annular slot, and the collar is swaged so that the collar and conduit are fixed by being swaged onto the spigot portion.

2. A combination as claimed in claim 1 wherein the core member has three spigot portions forming a T-shape.

3. A conduit connection fitting as claimed in claim 2 wherein the spigot portions each include at least one circumferential rib on the outer surfaces thereof.

4. A conduit connection fitting as claimed in claim 1 wherein the sleeve member is constructed of a molded plastic material.

5. A conduit connection fitting as claimed in claim 1 including at least one conduit, ends of each conduit being positioned in a respective annular slot and the collar being swaged so as to grip the ends between the collar and the spigot portion of the core member.

6. A conduit connection fitting as claimed in claim 1 wherein the sleeve member is provided in two halves, the halves being hinged to one another.

7. A conduit connection fitting as claimed in claim 6 wherein the core member has three spigot portions forming a T-shape.

8. A method of assembling a conduit connection fitting, comprising the steps of:
   providing a rigid core member having an axial bore therethrough and at least two spigot portions;
   opening a resilient sleeve member and positioning and closing it about a central part of the core member so that the spigot portions extend beyond ends of the sleeve member; the sleeve member being stepped adjacent each of the spigot portions so as to provide an annular rebate at each spigot portion; and
   supporting a collar on each rebate so as to form an annular slot between an inner surface of the collar and an outer surface of each spigot portion, sliding a conduit in the annular slot and swaging each collar about the conduit.

9. A method as claimed in claim 8 wherein the sleeve member is provided in two halves, the halves being hinged to one another, and the step of opening and closing comprises opening and closing the sleeve member about the hinge.

10. A method as claimed in claim 9 wherein the core member has three spigot portions forming a T-shape.

11. A method as claimed in claim 8 wherein the core member has three spigot portions forming a T-shape.

12. A method as claimed in claim 8 wherein the steps of sliding and swaging comprise positioning ends of conduits to be connected in the annular slots, and swaging each collar so as to grip an end of a conduit so positioned between the outer surface of the spigot portions and the inner surface of the collar.

* * * * *